Aug. 28, 1962

J. H. ROBERTS 3,051,063

COMPACTOR ROLLER

Filed Feb. 19, 1959

INVENTOR:
JAMES H. ROBERTS,
BY David Young
ATT'Y.

Aug. 28, 1962  J. H. ROBERTS  3,051,063
COMPACTOR ROLLER
Filed Feb. 19, 1959  10 Sheets-Sheet 7

*Fig. 8*

INVENTOR;
JAMES H. ROBERTS,
BY David Young
ATT'Y.

Aug. 28, 1962   J. H. ROBERTS   3,051,063
COMPACTOR ROLLER
Filed Feb. 19, 1959   10 Sheets-Sheet 8

Fig. 9

INVENTOR;
JAMES H. ROBERTS,
BY David Young
ATT'Y.

Aug. 28, 1962  J. H. ROBERTS  3,051,063
COMPACTOR ROLLER
Filed Feb. 19, 1959  10 Sheets-Sheet 10

Fig. 11

INVENTOR;
JAMES H. ROBERTS,
BY
David Young
ATT'Y.

United States Patent Office 3,051,063
Patented Aug. 28, 1962

3,051,063
COMPACTOR ROLLER
James H. Roberts, Galion, Ohio, assignor to Jeffrey
Galion Manufacturing Company, a corporation of Ohio
Filed Feb. 19, 1959, Ser. No. 794,282
4 Claims. (Cl. 94—50)

The instant invention relates to compactor rollers comprising a plurality of compacting wheels adapted to be traversed over a ground surface for compacting the material of the ground, and more particularly to improved means for mounting and supporting the wheels of the compactor roller.

It is an object of the invention to provide an improved compactor roller having a group of compacting wheels and including means for steering the compacting wheels, in which there is a minimum loss in width of support for the compactor roller when the wheels are steered.

It is another object of the invention to provide an improved compactor roller having a group of compacting wheels and including means for mounting the wheels, which permits lateral adjustment of the wheels in accordance with the uneven contours of the ground surface traversed by the wheels, with a minimum loss in the width of support for the compactor roller by the wheels as they adjust to the uneven contours of the ground surface.

It is a further object of the invention to provide an improved compactor roller having a group of compacting wheels and including reciprocable means for mounting and supporting the wheels on the compactor roller, and permitting vertical adjustment of the wheels to conform the positions of the wheels to uneven contours of the ground surface, to maintain the compacting wheels in full contact with the ground surface for applying a compacting force thereto.

It is also an object of the instant invention to provide an improved compactor roller having a group of compacting wheels and including reciprocable means mounting and supporting the wheels on the compactor roller, and permitting vertical adjustment of the compacting wheels to conform the positions of the compacting wheels to uneven contours of the ground surface, and including motion transmitting means conected to the reciprocable wheel mounting and supporting means for adjusting the wheels relatively to each other as the compacting wheels traverse an uneven or irregular ground surface to maintain the compactor roller in a substantially level position.

Other objects of the invention will appear hereinafter, the novel features and combinations being set forth in the appended claims.

Figure 1:
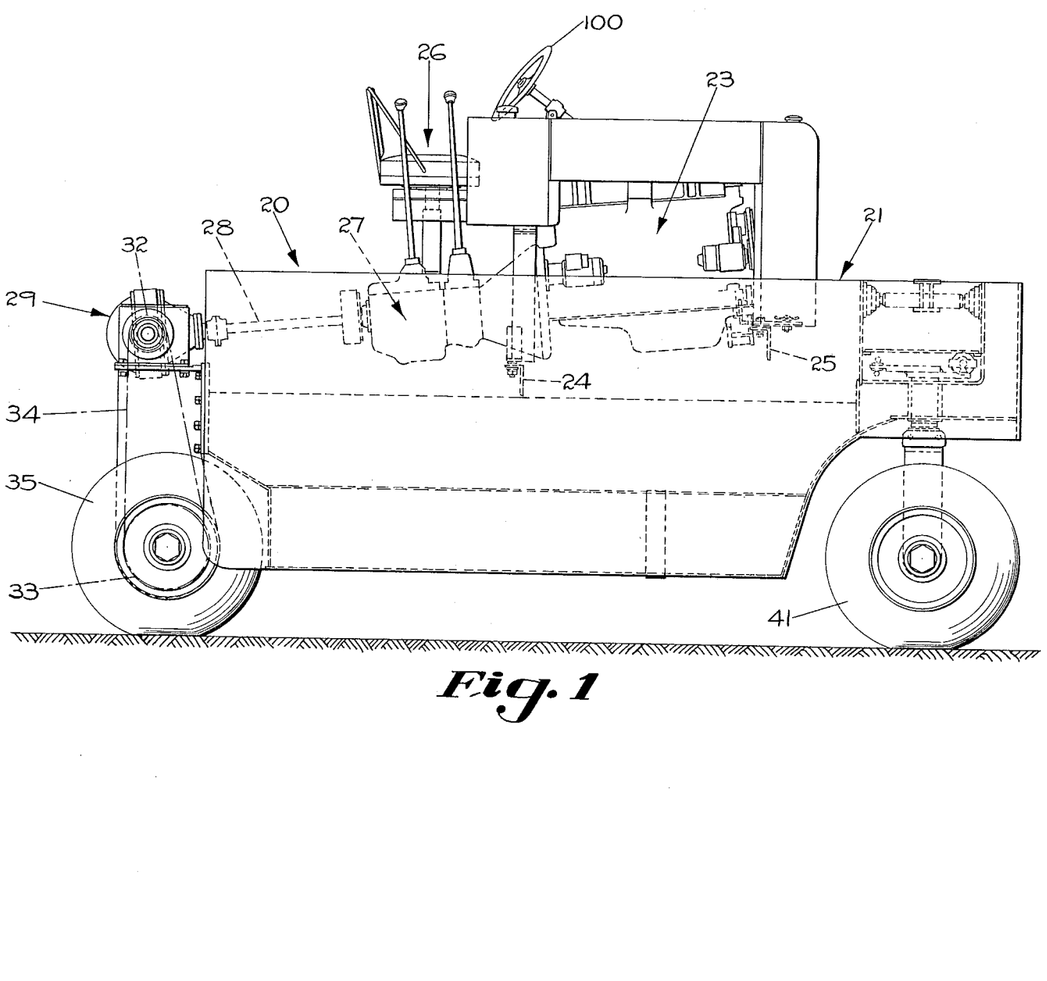
FIG. 1 is a side elevational view of a compactor roller embodying the instant invention.
Figure 4:
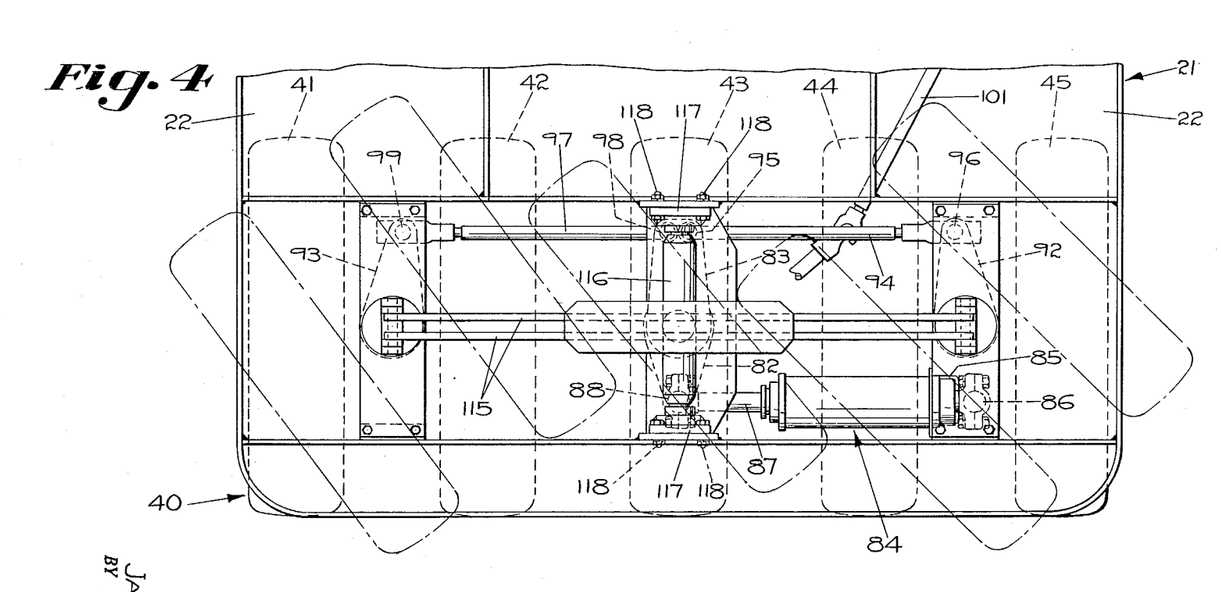
FIG. 4 is a top plan view of the front end of the compactor roller.

The instant invention relates to compactor rollers which generally comprise a plurality of compacting wheels adapted to be traversed over a ground surface, and to apply a high unit loading to all portions of the ground surface traversed by the compacting wheels for compacting the material of the ground. Referring to FIG. 1, there is illustrated therein a compactor roller 20 comprising a main frame 21, which may be fabricated from metal plates which are joined in assembly by welding. The main frame 21 is formed with bunkers 22 disposed one at each side of the main frame 21, and extending longitudinally of the compactor roller 20, as best seen in FIG. 4. The bunkers 22 are filled with ballast in the form of dense material, which may be rock or earth, to weight the compactor roller 20. The weight of the ballast loaded into the bunkers 22 provides the force for compacting the material of the ground surface over which the compactor roller 20 is driven during the operation thereof.

The compactor roller 20 further includes a power plant 23, usually of the internal combustion type, which is suitably mounted on transverse supporting members 24, 25 which extend laterally between the bunkers 22 and are secured to the main frame 21 as a part thereof. An operator's station 26 is provided at the top of the main frame 21, preferably at one side thereof, with appropriate controls for operating the power plant 23 and the compactor roller 20. Power is delivered from the power plant 23 through suitable transmission devices 27 to a drive shaft 28, which is connected to and drives the gears of a differential gearing mechanism 29.

Shafts 30, 31 extend laterally from the differential gearing mechanism 29 to opposite sides thereof, and are driven by the gears of the differential gearing mechanism 29. Each shaft 30, 31 has secured to the end thereof a pair of drive sprockets 32 which are disposed in alignment with driven sprockets 33, the latter being disposed in pairs to correspond with the pairs of drive sprockets 32. Suitable drive chains 34 are trained on the sprockets 32, 33 for transmitting the drive from the drive sprockets 32 to the drive sprockets 33. Each pair of driven sprockets 33 is suitably secured to a driven shaft which has compacting wheels 35 mounted on the opposite ends thereof to be driven by the driven shaft. It will be apparent to those skilled in the art that the compactor roller drive system, heretofore described, utilizes a conventional drive system and, therefore, is not illustrated and described in any greater detail.

Figure 2:
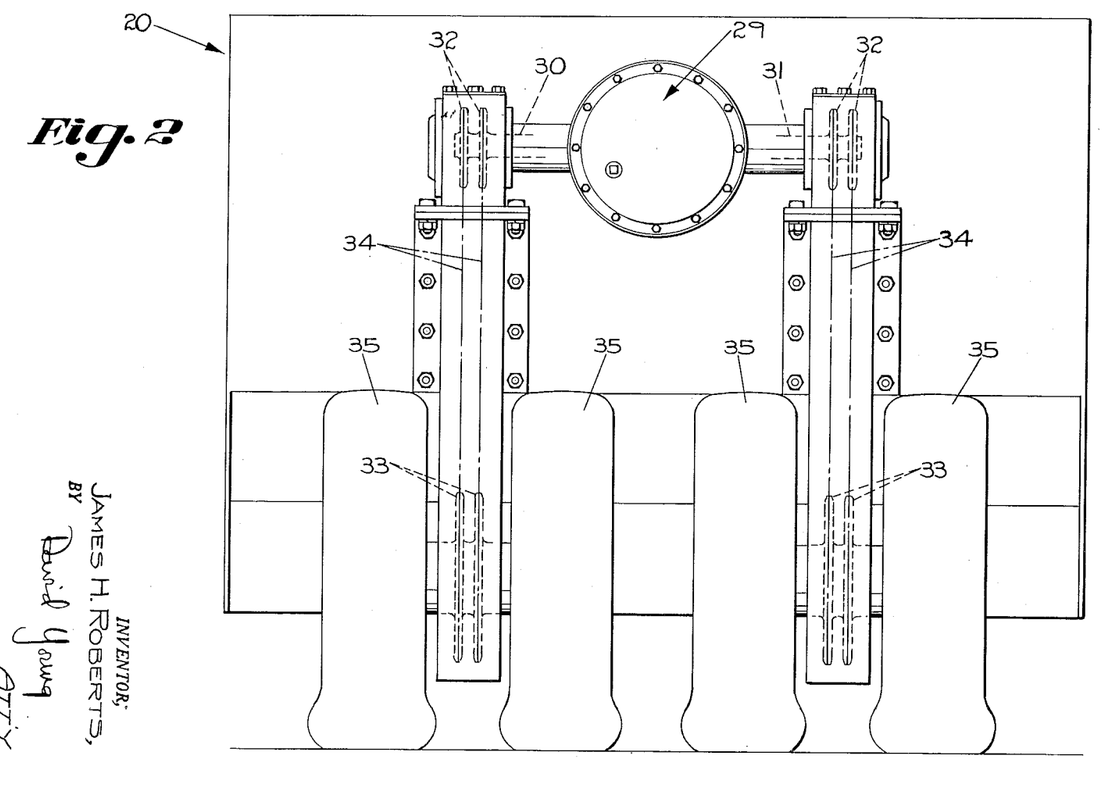
FIG. 2 is a rear elevational view of the compactor roller showing the drive wheels thereof.
Figure 3:
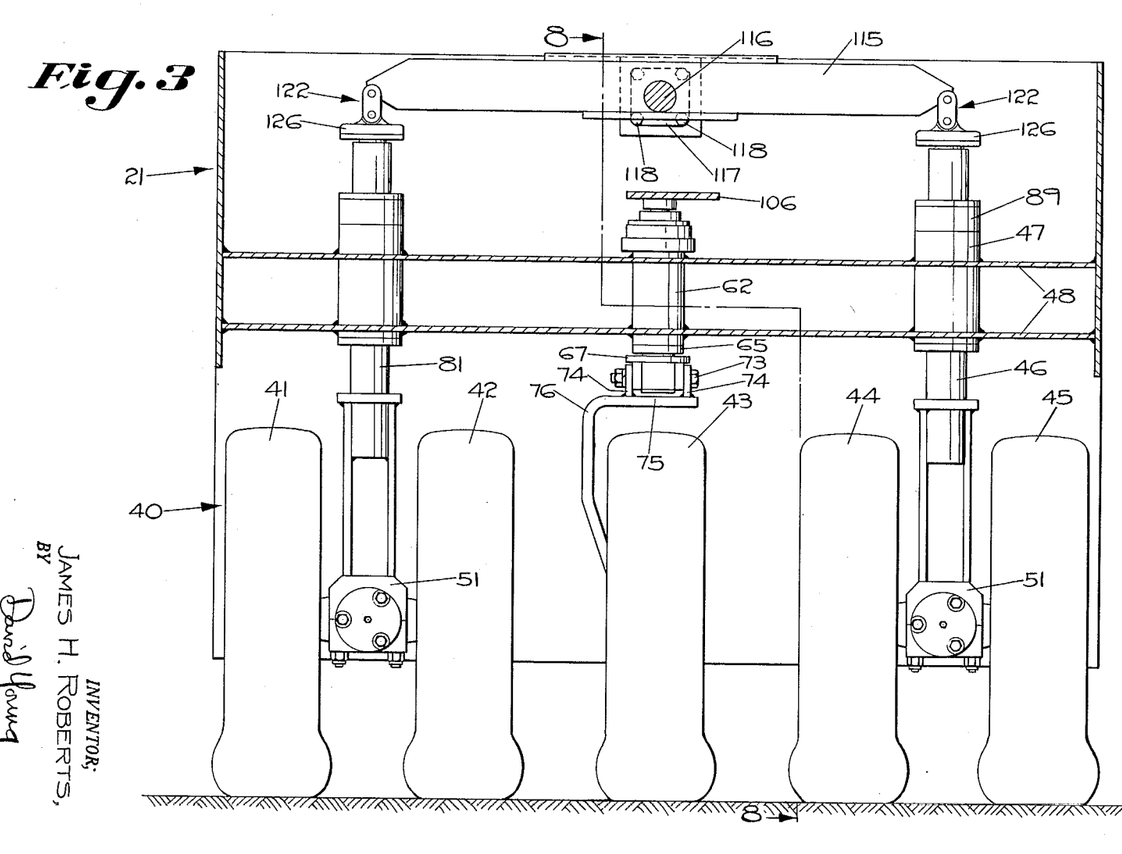
FIG. 3 is a front elevational view partially in section of the compactor roller showing the front compacting wheels thereof and the mounting and supporting means for the compacting wheels.

The compactor roller drive wheels 35 are regularly spaced in a lateral direction at the rear of the compactor roller 20, with four such driving wheels 35 being provided for driving the compactor roller. At the front end of the compactor roller 20 there is provided another group of compacting wheels 40 comprising compacting wheels 41, 42, 43, 44, 45, which are disposed in transverse alignment, and which are alternated with respect to the drive compacting wheels 35 in a direction longitudinally of the compactor roller 20. The compacting wheels at the front and rear of the compactor roller 20 are alternated in this manner for the purpose of traversing all portions of the ground surface in a pass of the compactor roller 20 thereover, to compact all portions of the ground.

The front compacting wheels 41, 42 are paired, as are also the front compacting wheels 44, 45, and the pairs of compacting wheels 41, 42 and 44, 45 are disposed at opposite sides of the compactor roller main frame 21. The front compacting wheel 43 is centrally disposed with respect to the main frame 21 and is individually mounted thereon, as best seen in FIG. 3. The structure for mounting and supporting the pairs of front compacting wheels 41, 42 and 44, 45 is identical, although disposed at the opposite sides of the main frame 21, and therefore only the structure appurtenant to the pair of front compacting wheels 44, 45 will be described in complete detail hereafter.

Figure 7:
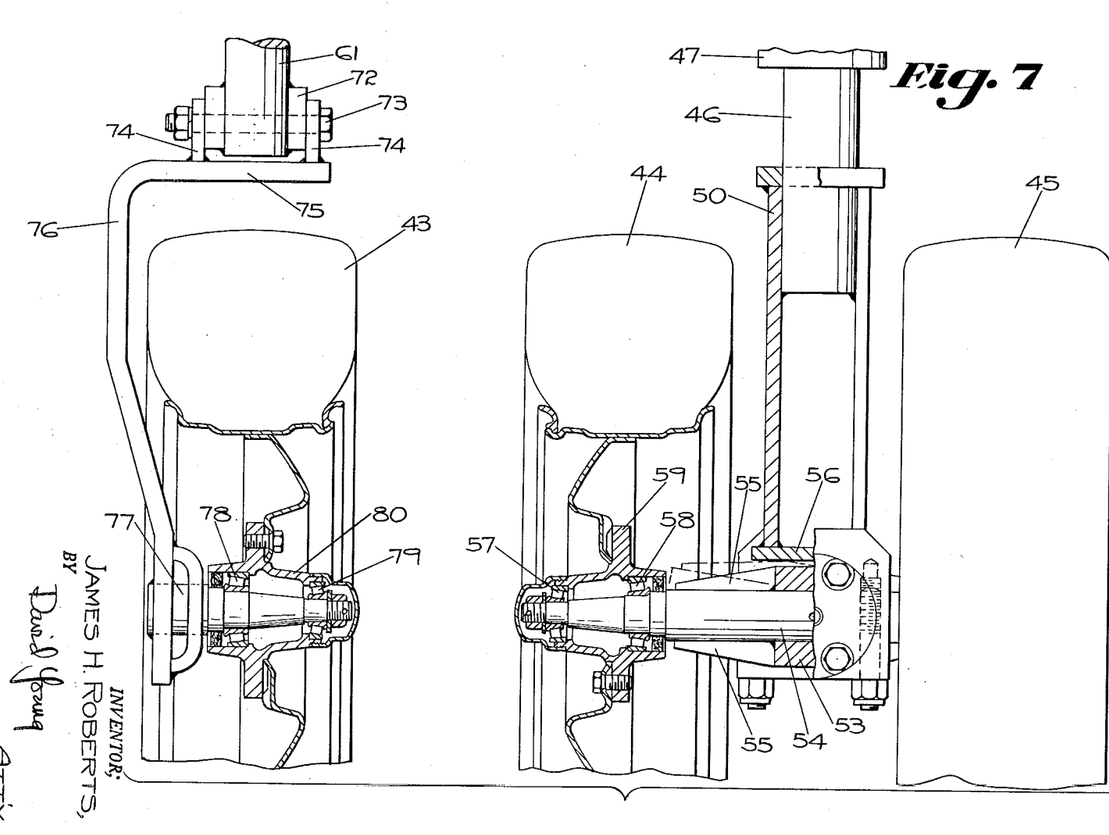
FIG. 7 is an elevational view, partially in section, of the means for mounting and supporting the compacting wheels.

The mounting and supporting means for the pair of front compacting wheels 44, 45 comprises an upright cylindrical king pin 46, for which there is provided supporting means in the form of a cylindrical support member 47 that is secured to plates 48 of the main frame 21, as by welding. The bore of the support member 47 is fitted at the opposite ends thereof with cylindrical bearing elements 49, which are complemental to the king pin 46, and permit the king pin 46 to rotate and to reciprocate relatively to the support member 47 for a purpose to be described hereinafter. The lower end of the king pin 46 is provided with a depending extension 50, fabricated from a plurality of plate members which are welded in assembly, and secured to the lower end of the king pin 46 by welding. The lower end of the king pin extension 50 has secured to each of the front and rear sides thereof a bearing housing 51 which is suitably bored for the reception therein of a suitable roller bearing 52. The opposite ends of a trunnion 53 are fitted within the roller bearings 52, and the trunnion 53 is thereby pivotally mounted at the lower end of the king pin extension 50, for tilting about an axis extending longitudinally of the compactor roller 20. A fixed shaft 54 extends through the trunnion 53, and is secured thereto as by welding, whereby the shaft 54 is supported on the lower end of the king pin extension 50 for tilting about an axis extending longitudinally of the compactor roller 20. Gusset plates 55 extend laterally from the trunnion 53 at the opposite sides thereof along the shaft 54, and are welded to the trunnion 53 and to the shaft 54, thereby rigidifying the assembly, and further forming abutments serving to limit the transverse tilting of the shaft 54, by abutment of one or the other of the upper gusset plates 55 against the bottom plate 56 of the king pin extension 50, as seen in FIG. 7 in broken lines.

The opposite ends of the shaft 54 are turned down to provide seats for suitable roller bearings 57, 58. Each of the roller bearings 57, 58 is fitted on the shaft 54 and is also fitted in the hub 59 of the front compacting wheel 44, whereby the compacting wheel 44 is rotatably mounted on the shaft 54. The front compacting wheel 45 is mounted on the opposite end of the shaft 54 by a bearing structure that is identical to that described in connection with the front compacting wheel 44. Thus the front compacting wheels 44, 45 are mounted in a pair at the lower end of the king pin 46, and are mounted thereon for lateral adjustment on the axis of the trunnion 53, whereby the pair of compacting wheels 44, 45 will assume positions conforming to the unevenness of the ground surface traversed by the compacting wheels 44, 45.

The center compacting wheel 43 is mounted on the lower end of a relatively short king pin 61. The king pin 61 is mounted on the main frame 21 by a cylindrical support member 62 which is secured to the main frame 21 by welding it to the main frame plates 48. The opposite ends of the support member 62 include cylindrical bearing elements 63, which are fitting in the bore of the support member 62 and are complemental to the king pin 61 for rotatably supporting the king pin 61 within the support member 62. Snap rings 64 are attached to the king pin 61 inside of the bearing elements 63, to position the king pin 61 within the support member 62 in an axial direction. The lower end of the support member 62 is provided with a collar 65 having an angle section, within which there is disposed a suitable thrust bearing 66. The king pin 61 has secured thereto a collar 67, which also has an angle section and is substantially complemental to the collar 65, and bears against the thrust bearing 66. At the upper end of the support member 62 there is provided an end plate 68 which supports a suitable thrust bearing 69. A cap or collar 70 is secured to the top of the king pin 61 by means of a plurality of bolts 71, and the cap 70 is fitted over the top of the support member 62, and bears against the thrust bearing 69. It is thus seen that the king pin 61 is supported on the main frame 21 by the support member 62 for rotation of the king pin 61 relatively to the main frame 21, but that the king pin 61 is fixed relatively to the main frame 21 in an axial direction.

At the lower end of the king pin 61, which includes wheel support arm 76, there is provided a connecting member 72 which is secured to the collar 67 and to the king pin 61. The connecting member 72 has secured thereto by means of suitable bolts 73 a pair of upstanding ears 74, which are disposed on opposite sides of the connecting member 72. The bolts 73 secure the upstanding ears 74 to the connecting member 72 in fixed position, as shown in the drawings, and the bolts 73 may be disposed in any desired manner to accomplish this purpose, as will be apparent to those skilled in the art. The upstanding ears 74 are secured, as by welding, to the laterally extending portion 75 of the cantilever support arm 76 for the center compacting wheel 43. The lower end of the cantilever support arm 76 has secured thereto, as by welding, a fixed shaft 77 that extends laterally therefrom. The end of the shaft 77 is turned down for the reception of suitable roller bearings 78, 79, which are fitted thereon, and which are also fitted within the hub 80 of the center wheel 43 to thereby rotatably mount the center wheel 43 on the fixed shaft 77 at the lower end of the cantilever supporting arm 76.

It is thus seen that the center compacting wheel 43 is mounted on a rotatable king pin 61, whereby the center wheel 43 may be turned for steering of the compactor roller 20. Each of the pairs of compacting wheels 41, 42 and 44, 45 is similarly mounted on a rotatable king pin 81, 46, respectively, whereby these compacting wheels also may be turned in pairs for steering the compactor roller 20. The specific means for turning the front group of compacting wheels 40 to steer the compactor roller 20 will now be described in further detail.

The lower portion of the cap 70 is formed with an integral steering arm 82 which extends forwardly therefrom, as seen in FIG. 4. The upper portion of the cap 70 is also formed with an integral steering arm 83 extending rearwardly from the cap 70. A cylinder and piston mechanism 84 has its cylinder end 85 secured to the main frame 21 on a ball and socket connection 86 for pivotal movement of the cylinder and piston mechanism 84 relatively to the main frame 21 during the operation thereof. The end of the piston rod 87 is secured to the forwardly extending steering arm 82 on a ball and socket connection 88, which permits relative movement between the steering arm 82 and the piston rod 87 during the operation of the cylinder and piston mechanism 84. The cylinder and piston mechanism 84 is operated by hydraulic fluid supplied under pressure by conventional hydraulic control means to reciprocate the piston rod 87 in either direction for applying a force to the steering arm 82, which, being secured to the king pin 61 through the cap 70, will rotate the king pin 61 and thereby turn the center compacting wheel 43 for steering the compactor roller. Since the steering arm 83 is rigidly connected to the steering arm 82 through the cap 70, the steering arm 83 will also be turned as the steering arm 82 is turned by the cylinder and piston mechanism 84.

Each of the king pins 46, 81 for the pairs of compacting wheels 44, 45 and 41, 42, respectively, is provided with a steering collar 89 which is disposed immediately above, and concentrically with the support member 47. Each of the king pins, 46, 81 is formed with an axially extending key slot 90 for the reception of a key 91 which locks the steering collars 89 to the king pins 46, 81. Thus the steering collars 89 are non-rotatably secured to the king pins 46, 81, but the king pins 46, 81 can reciprocate relatively to the steering collars 89. A steering arm 92 is secured to the steering collar 89 for the king pin 46, and a steering arm 93 is secured to the steering collar 89 for the king pin 81. The steering arms 92, 93 extend rearwardly from the king pins 46, 81, respectively, and are disposed in substantially transverse alignment with the steering arm 83 on the center king pin 61. A steering link 94 has its opposite ends secured to the steering arms 83, 92 by ball and socket connections 95, 96, respectively, which permit relative movement of the steering link 94 and the steering arms 83, 92. Similarly, a steering link 97 has its opposite ends secured to the steering arms 83, 93 by ball and socket connections 98, 99, respectively, which permit relative movement of the steering link 97 and the steering arms 83, 93. Thus, as the steering arm 83 is turned the motion thereof will be transmitted by the steering links 94, 97 to the steering arms 92, 93, respectively, thereby rotating the king pins 46, 81 to turn the pairs of compacting wheels 44, 45 and 41, 42, respectively, at the same time that the center compacting wheel 43 is turned, for steering of the compactor roller 20, as seen in FIG. 4 in broken lines.

Power for steering the compactor roller 20 is provided by the hydraulic cylinder and piston mechanism 84. The operator of the compactor roller steers the machine by use of the steering wheel 100 which is disposed at the operator's station 26. The steering wheel 100 is connected by a steering linkage 101 to a steering gear 102 of a conventional form which includes a hydraulic control valve. The steering gear 102 is secured to longitudinally extending plate 106 and includes a depending splined shaft 103 that extends through aperture 107 formed in the plate 106, and which is engaged with a cap 104 secured to the cap 70 at the top of the king pin 61 by a plurality of bolt 105. Initial rotation of the steering wheel 100 operates the hydraulic control valve which is included in the steering gear 102 to deliver hydraulic fluid to the cylinder and piston mechanism 84 for steering the compactor roller 20. The turning movement of the compacting wheels 40 is transmitted back to the steering gear 102 by the king pin 61 through the steering gear shaft 103, in response to which the hydraulic control valve is operated to stop the flow of hydraulic fluid to the cylinder and piston mechanism 84 when the compacting wheels have been turned to the desired position. This steering system is not described in detail for the reason that it is a conventional steering mechanism which is commercially available.

The king pins 46, 81 are connected to each other by a transversely disposed motion transmitting link 115 to which there is secured a pivot pin 116 that extends transversely of the link 115. Each of the opposite ends of the pivot pin 116 is rotatably supported in a bearing assembly 117 secured to the main frame 21 by a plurality of bolts 118. Each end of the motion transmitting link 115 has secured thereto, as by welding, a barrel 119 with sleeve bearings 120 disposed in the opposite ends of the bore thereof. A pin 121 is disposed within the barrel 119 and is rotatably supported therein by the bearings 120. The pin 121 is part of a link 122 that includes another pin 123, which is rotatably supported by sleeve bearings 124 in a bore 125 formed in an end cap 126. The end cap 126 fits over the top of the king pin 46, and includes a suitable bearing 127 that is interposed between the end cap 126 and the top of the king pin 46, the latter being reduced in diameter to fit the bearing 127. The end cap 126 and the bearing 127 are held in place on the upper end of the king pin 46 by a snap ring 128, whereby there is no relative movement of the king pin 46 and the end cap 126 in an axial direction, although the king pin 46 is permitted to rotate relatively to the end cap 126. The link 122, which secures the motion transmitting link 115 to the king pin 46 forms an articulated connection therebetween, and is interposed to permit relative movement of the motion transmitting link 115 and the king pin 46. The opposite end of the motion transmitting link 115 is secured to the top of the king pin 81 by an articulated link 122 and an end cap 126 identical to that hereinbefore described.

In the operation of the compactor roller 20 embodying the instant invention, when the compacting wheels 41, 42 encounter a high spot in the ground surface the king pin 81 will be reciprocated upwardly, thereby pivoting the motion transmitting link 115 in a clockwise direction on the pivot pin 116 and acting to lower the king pin 46 and the compacting wheels 44, 45. The net result of this action is to maintain the compactor roller 20 in a substantially level position as it traverses an uneven ground surface. This is of particular importance in compactor rollers constructed as illustrated herein, for the reason that the machine has a relatively high center of gravity which makes it particularly susceptible to rolling over, should the compactor roller be tilted too far in one or the other direction.

Since the pairs of compacting wheels 41, 42 and 44, 45 are each adjustable by tilting of the respective shafts 54 about an axis extending longitudinally of the compactor roller, these wheels will adjust their positions in accordance with any unevenness of the ground surface that is traversed by the pairs of compacting wheels 41, 42 and 44, 45. Since the pairs of wheels 41, 42 and 44, 45 are each independently adjustable by tilting of the respective shafts 54, there is a relatively small loss in the supporting width of the compacting wheels for the compactor roller 20, thereby adding to the stability of the compactor roller 20. The compactor roller 20 is further stabilized by the construction of the means for steering the front group of compacting wheels 40, in that the pairs of compacting wheels 41, 42 and 44, 45 and the center compacting wheel 43 include separate means comprising the king pins 46, 61, 81, respectively, for turning these wheels, whereby the loss of supporting width of the group of compacting wheels 40 for the compactor roller 20 is very small, thereby eliminating the possibility of the compactor roller 20 rolling over during the steering thereof.

Figure 9:
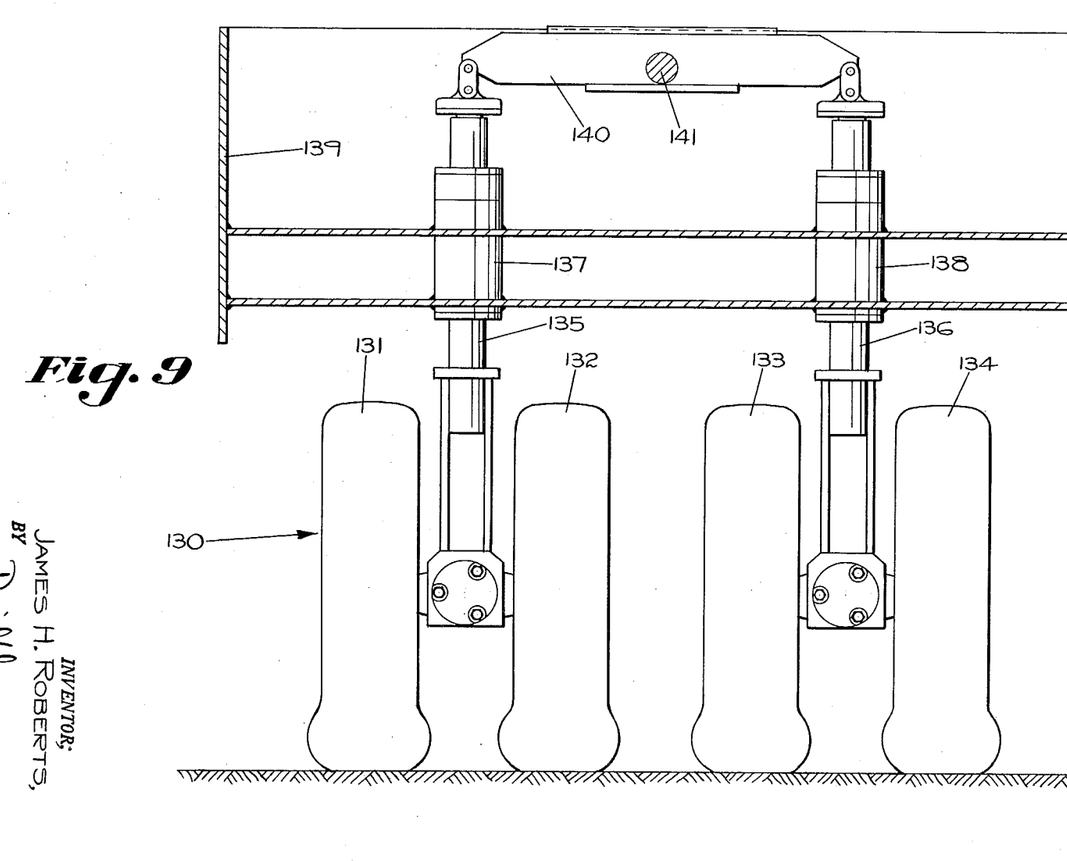
FIG. 9 illustrates another embodiment of the instant invention in a compactor roller in which the center compacting wheel is omitted.

In FIG. 9 there is illustrated another embodiment of the invention hereinbefore described, in which the group of front compacting wheels 130 comprises only four compacting wheels 131, 132, 133, 134. In this embodiment of the invention, the drive compacting wheels at the rear of the compactor roller 20 may be five in number, with the latter being alternated with the front group of compacting wheels 130, as described hereinabove, so that all portions of the ground surface traversed by the compactor roller have a compacting force applied thereto by at least one compacting wheel.

Figure 8:
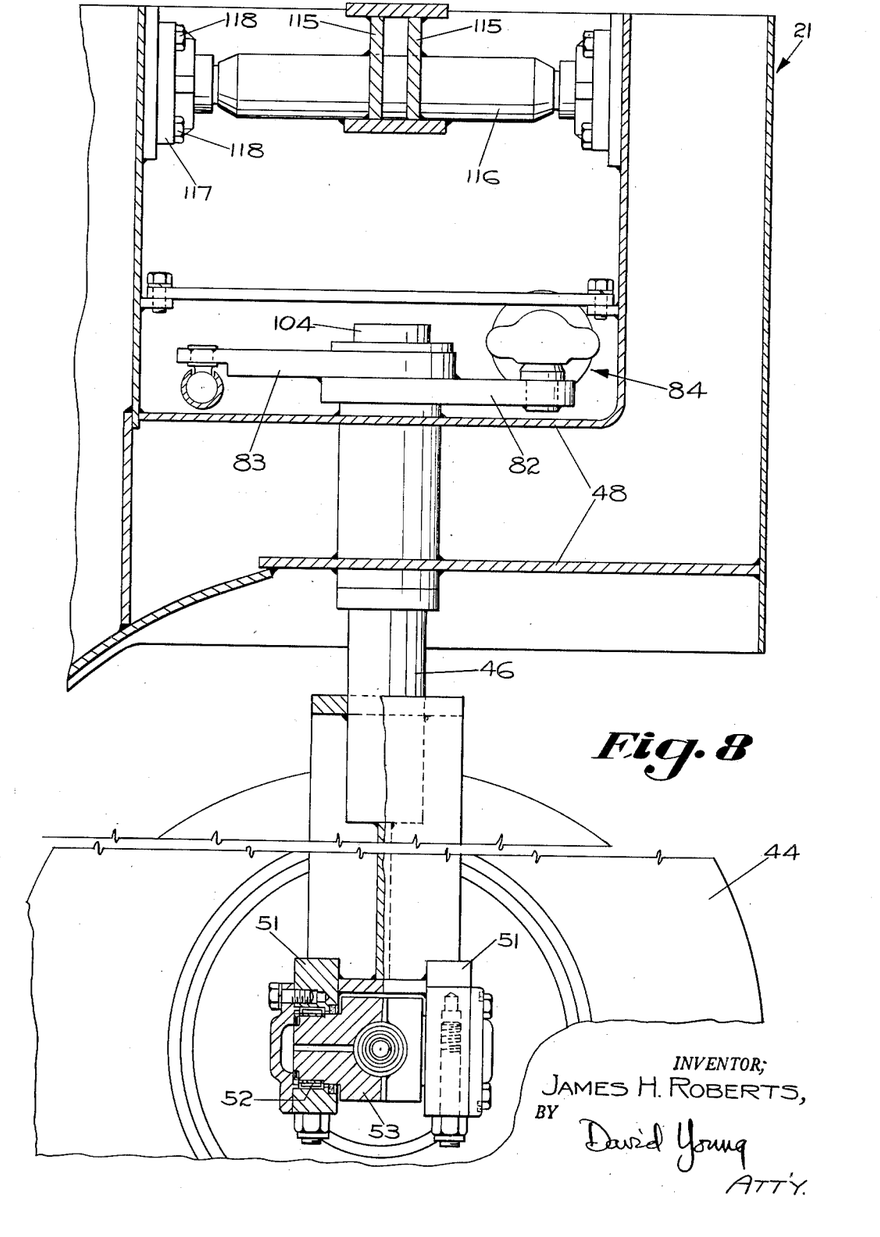
FIG. 8 is a sectional view of the means for mounting and supporting the compacting wheels, taken on line 8—8 in FIG. 3.

In the instant embodiment of the novel compactor roller the center compacting wheel is omitted, whereby there are provided two pairs of compacting wheels 131, 132 and 133, 134 which are mounted on the king pins 135, 136, respectively. Support members 137, 138 are secured to the main frame 139, and include the same structure as described in connection with the support member 47 for the first embodiment of the invention, for rotatably and reciprocably mounting the king pins 135, 136 on the main frame 139. A motion transmitting link 140 is connected to the upper ends of the king pins 135, 136 by the same structure as that illustrated in FIGS. 5 and 6, with the motion transmitting link 140 having secured thereto a pivot pin 141, mounting the motion transmitting link 140 on the main frame 139 for oscillation on a longitudinally extending axis. Thus the pairs of compacting wheels 131, 132 and 133, 134 are adjustable relatively to each other upwardly and downwardly by reciprocation of the king pins 135, 136, in accordance with any unevenness in the contour of the ground surface being traversed by the group of compacting wheels 130. Each pair of compacting wheels 131, 132 and 133, 134 is mounted for tilting on a longitudinally extending axis at the lower end of the king pins 135, 136, respectively, by the same structure as illustrated in FIGS. 7 and 8 for mounting the compacting wheels 44, 45 at the lower end of the king pin 46, whereby the pairs of compacting wheels 131, 132 and 133, 134 are each laterally adjustable in accordance with any irregularities in the contour of the surface being traversed thereby.

Figure 10:
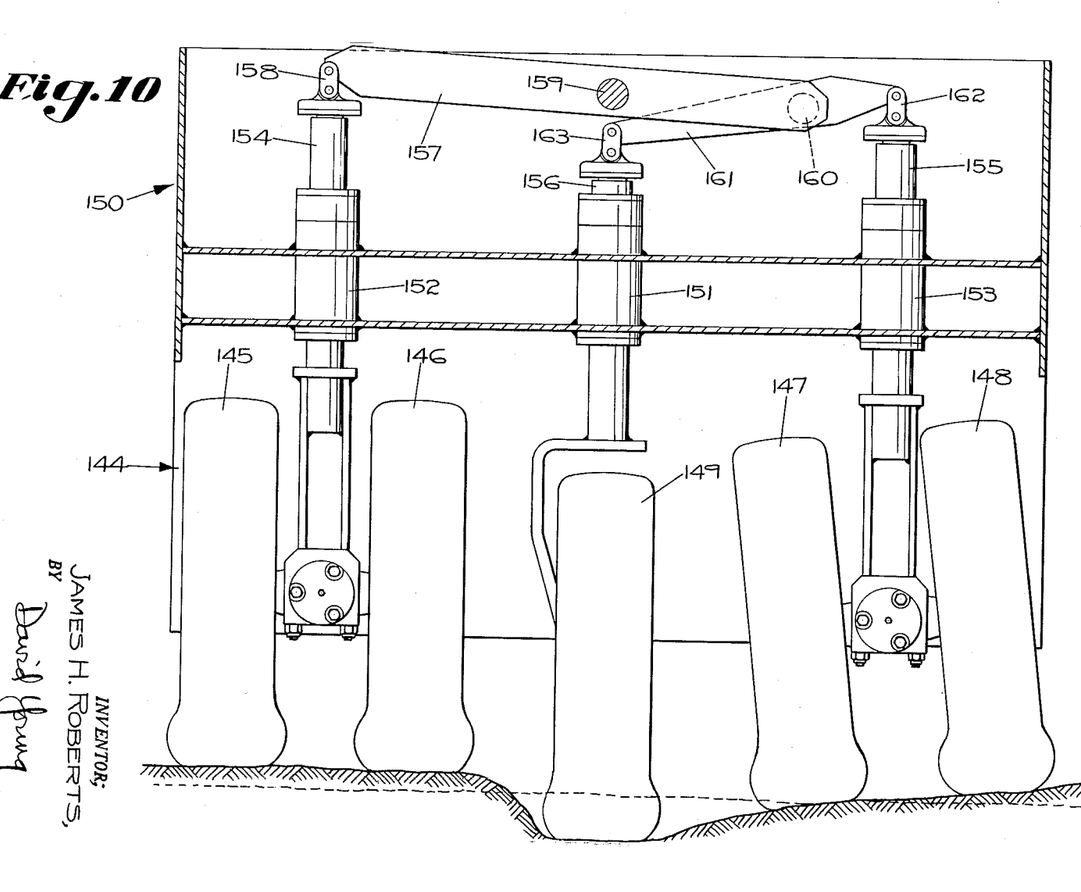
FIG. 10 illustrates another embodiment of the invention in which each of the compacting wheels is supported on reciprocable means.

In FIG. 10 there is illustrated still another embodiment of the instant invention which corresponds to the embodiment of the invention illustrated in FIGS. 1 to 8, and in which the center compacting wheel is mounted in the main frame for reciprocation upwardly and downwardly. The compactor roller illustrated in FIG. 10 comprises a front group of compacting wheels 144 having two pairs of compacting wheels 145, 146 and 147, 148, and a center compacting wheel 149. The structure for supporting the pairs of compacting wheels 145, 146 and 147, 148 on the main frame 150 is identical to that illustrated in FIGS. 5, 7 and 8, and therefore the description thereof is not repeated. The structure for supporting the center compacting wheel 149 on the main frame 150 comprises a support member 151 that is identical to the support members 152, 153 utilized for the pairs of compacting wheels 145, 146 and 147, 148, respectively, whereby the center compacting wheel 149 is supported on the main frame 150 for reciprocation upwardly and downwardly, as well as for turning in steering the compactor roller.

Figures 5, 6:
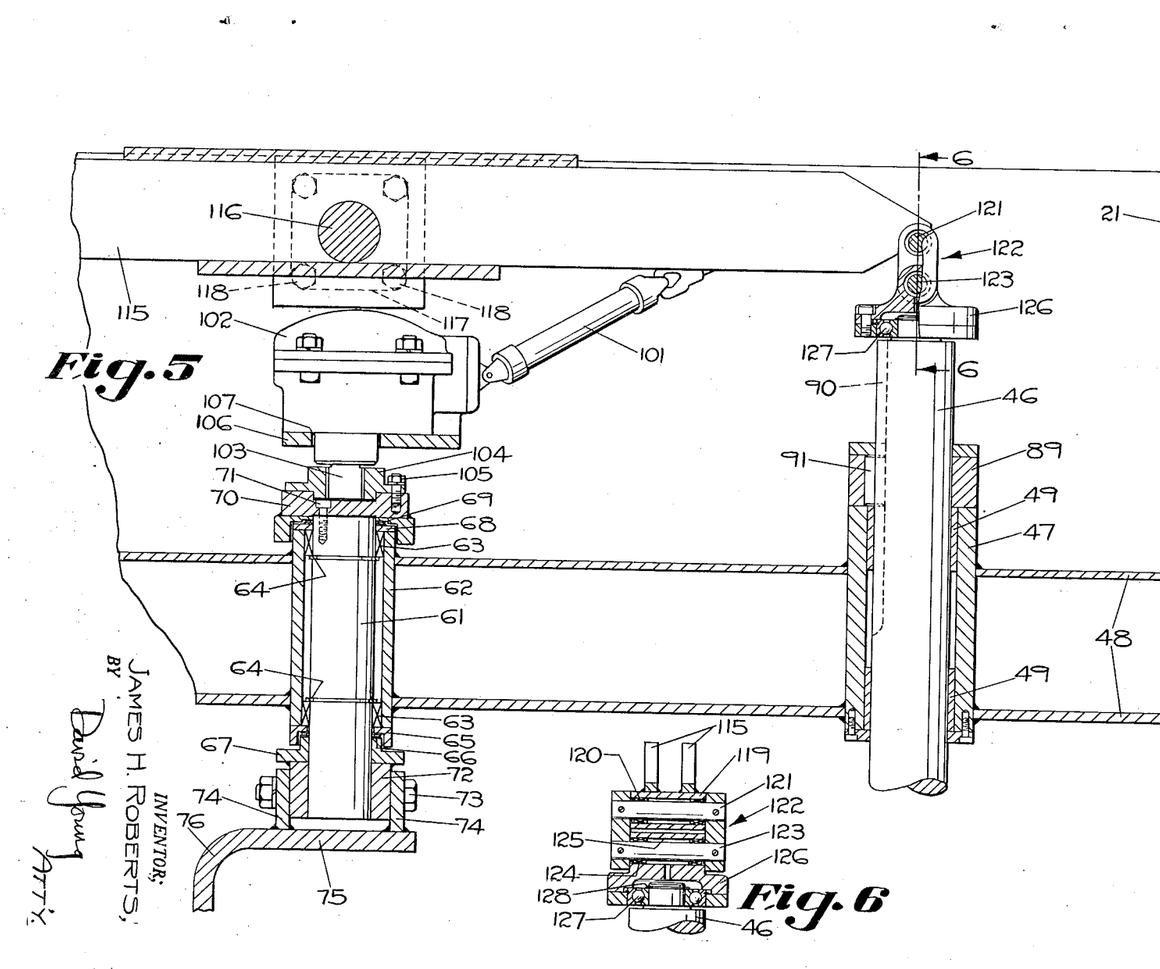
FIG. 5 is an elevational view, partially in section, of the means for mounting and supporting the compacting wheels.
FIG. 6 is a sectional view taken on the line 6—6 in FIG. 5.

A motion transmitting link 157 is connected to the upper end of the king pin 154 for the pair of compacting wheels 145, 146 by a link 158 that forms an articulated connection, and which is identical to the link 122 and the appurtenant structure illustrated in FIG. 6. The motion transmitting link 157 has secured to it a pivot pin 159 which is pivotally mounted on the main frame 150 in the same manner as illustrated in FIG. 8 in connection with the pivot pin 116. The pivot pin 159 is centrally disposed in a lateral direction with respect to the main frame 150. The opposite end of the motion transmitting link 157 is pivotally secured by a pivot pin 160 to a second motion transmitting link 161. One end of the second motion transmitting link 161 is secured to the upper end of the king pin 155 for the pair of compacting wheels 147, 148 by a link 162, and the other end of the second motion transmitting link 161 is secured to the upper end of the king pin 156 for the center compacting wheel 149 by a link 163, with the links 162, 163 and the structure appurtenant thereto being identical to the corresponding structure of the link 158.

By means of the linkage comprising the motion transmitting links 157, 161, upward movement of the pair of compacting wheels 145, 146 as a result of traversing a high spot in the ground surface will be transmitted by the link 157 to the link 161, and through the latter will act to lower the center compactink wheel 149 and the pair of compacting wheels 147, 148, until all the wheels are in compacting engagement with the ground surface, as illustrated in FIG. 10. Since the second motion transmitting link 161 is pivotally mounted on the pivot pin 160, the center compacting wheel 149 and the pair of compacting wheels 147, 148 may move relatively to each other as dictated by the contour of the ground surface, as seen in FIG. 10. Each pair of compacting wheels 145, 146 and 147, 148 is mounted for tilting about a longitudinally extended axis, as previously described and illustrated in FIGS. 7 and 8, whereby there may be a further adjustment of the positions of the pairs of compacting wheels 145, 146 and 147, 148 to bear on the ground surface, as illustrated in FIG. 10, wherein the pair of compacting wheels 147, 148 is shown as being tilted in a counterclockwise direction.

Figure 11:
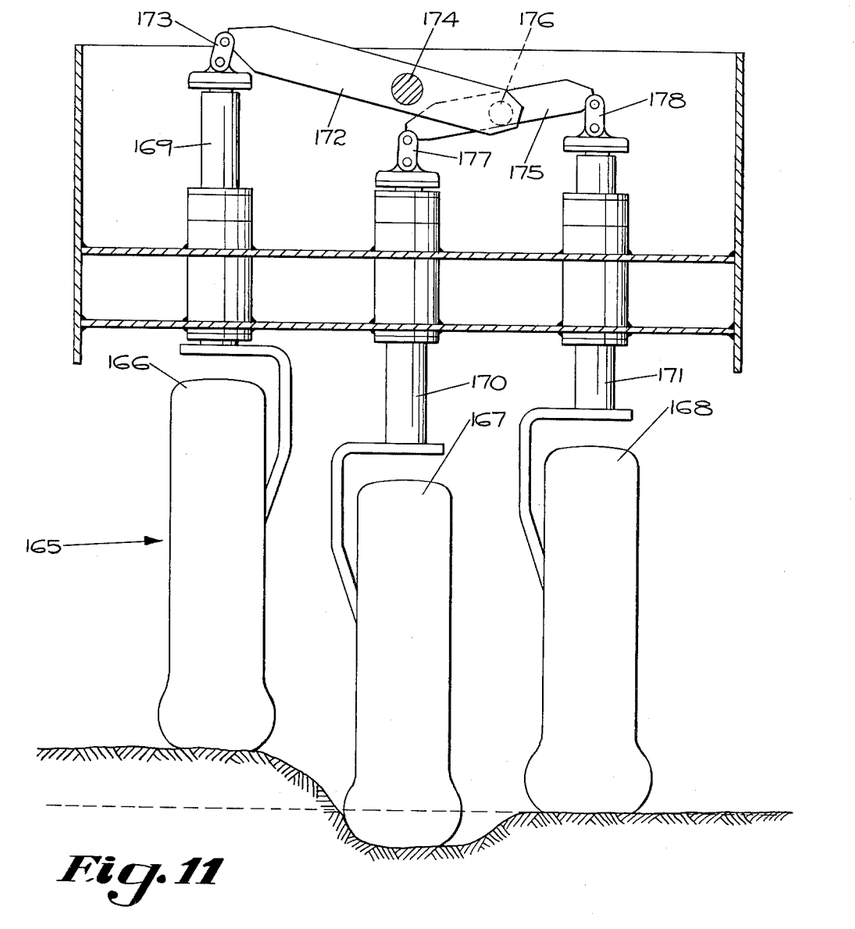
FIG. 11 illustrates still another embodiment of the invention in which each of the compacting wheels is individually mounted on reciprocable means.

In FIG. 11 there is illustrated a further embodiment of the invention which corresponds most closely to the embodiment of the invention illustrated in FIG. 10. In the instant embodiment of the invention, the front group of compacting wheels 165 comprises three compacting wheels 166, 167, 168. Each of the compacting wheels 166, 167, 168 is individually mounted on a king pin 169, 170, 171, respectively, which are supported for reciprocation and rotation on the main frame 164 utilizing the same structure therefor as previously described and illustrated in FIG. 5. A first motion transmitting link 172 is connected to the upper end of the king pin 169 by a link 173 forming an articulated connection. The motion transmitting link 172 has secured thereto a pivot pin 174 which is rotatably mounted on the main frame 164 on a longitudinally extending axis as previously described. The opposite end of the motion transmitting link 172 is connected to a second motion transmitting link 175 by a pivot pin 176. One end of the second motion transmitting link 175 is connected to the upper end of the king pin 170 by a link 177, and the other end of the second motion transmitting link 175 is connected to the upper end of the king pin 171 by a link 178.

The motion transmitting links 172, 175 operate in the same manner as described in connection with the structure of FIG. 10 to transmit the relative motion of the compacting wheels 166, 167, 168, whereby the compacting wheels 166, 167, 168 will conform to the uneven contours of the ground surface traversed by the compactor roller, as shown in FIG. 11. It is thus seen that the difference in the compactor roller structures illustrated in FIGS. 10 and 11 is that in the latter the king pins 169, 170, 171 each supports only a single compacting wheel. In the instant embodiment of the invention there is no loss in supporting width of the group of compacting wheels 165 when they are turned for steering the compactor roller.

Compactor rollers to which the instant invention is directed are intended for operation on relatively rough terrain. The compactor roller is designed specifically for the purpose of imposing high unit loadings on the ground through the compacting wheels of the machine, for the purpose of compacting the material of the ground without necessarily producing a level surface. It is a characteristic of the compactor roller that it is heavily loaded with ballast to provide the compacting force on the ground, and the construction of the compactor roller is such that it has a relatively high center of gravity which makes the machine particularly susceptible to rolling over, if it is tilted too far in one direction or the other as the compactor roller makes its passes over the relatively rough terrain. In accordance with the instant invention the front compacting wheels of the compactor roller are constructed to be adjustable upwardly and downwardly relatively to each other so that the compacting wheels will assume positions conforming to the irregularities of the ground surface being traversed, and the compactor roller will thereby be maintained in a substantially level position. As another feature of the invention there are provided pairs of compacting wheels which are adjustable in a lateral direction by tilting, to assume positions conforming to the irregularities in the ground surface, further adding to the stability of the compactor roller. In the compactor roller of this invention the compacting wheels may be turned for steering the machine, and in this connection there is provided structure for turning the wheels separately, which adds to the stability of the compactor roller in that there is a minimum loss or no loss in the supporting width of the compacting wheels for the compactor roller during steering thereof.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A multi-wheel compactor roller comprising a main frame, ground compacting wheels disposed in substantial transverse alignment for traversing a ground surface and compacting the material thereof, an upright rotatable and axially reciprocable cylindrical king pin for one pair of said compacting wheels, another upright rotatable and axially reciprocable cylindrical king pin for another pair of said compacting wheels, each king pin including means for rotatably mounting the compacting wheels of a pair of compacting wheels on the king pin at opposite sides of the king pin, said wheel mounting means including longitudinally extending pivot means to permit tilting of the wheel mounting means on the axis of the pivot means for adjustment of the positions of the compacting wheels on the king pin in accordance with the contours of the ground surface, supporting means for each said king pin secured to the main frame, said supporting means each including cylindrical means complementally formed with respect to a king pin and rotatably and axially reciprocably mounting the king pin on the main frame, a steering collar for each of said king pins, means non-rotatably securing the steering collar to the king pin and permitting axial reciprocation of the king pin relatively to the steering collar, a center upright king pin disposed intermediate the first said king pins, said center king pin including means for rotatably mounting a compacting wheel on the king pin, supporting means for the center king pin secured to the main frame, the last said supporting means including means rotatably mounting the center king pin on the main frame, a steering collar for the center king pin, means non-rotatably securing the steering collar to the center king pin, steering means operatively connected to the steering collars to turn the steering collars and the king pins and wheels for steering the compactor roller, and motion transmitting means secured to the first said king pin and said other king pin and connecting said king pins to transmit the axial reciprocatory motion of one king pin to the other king pin for axially reciprocating said king pins in opposite directions.

2. A multi-wheel compactor roller comprising a main frame, ground compacting wheels disposed in substantial transverse alignment for traversing a ground surface and compacting the material thereof, an upright rotatable and axially reciprocable cylindrical king pin for one of said compacting wheels, another upright rotatable and axially reciprocable cylindrical king pin for another of said compacting wheels, each king pin including means for rotatably mounting a compacting wheel on the king pin, supporting means for each king pin secured to the main frame, said supporting means each including cylindrical means complementally formed with respect to a king pin and rotatably and axially reciprocably mounting the king pin on the main frame, a center upright rotatable and axially reciprocable cylindrical king pin disposed intermediate the first said king pins, said center king pin including means for rotatably mounting a compacting wheel on the king pin, supporting means for the center king pin secured to the main frame, the last said supporting means including cylindrical means complementally formed with respect to a king pin and rotatably and axially reciprocably mounting the center king pin on the main frame, and motion transmitting means secured to the first said king pin and to said other king pin and center king pin and connecting the king pins to transmit the axial reciprocatory motion of the first said king pin to the other king pins for axially reciprocating the first said king pin and the other king pins in opposite directions, said motion transmitting means comprising a first motion transmitting link having one end secured to the first said king pin, a second motion transmitting link secured to said other king pin and said center king pin, pivot means disposed intermediate the ends of said first motion transmitting link pivotally mounting said first motion transmitting link, and pivot means connecting the end of the first motion transmitting link remote from the first said king pin to said second motion transmitting link intermediate the ends thereof.

3. A multi-wheel compactor roller comprising a main frame, ground compacting wheels disposed in substantial transverse alignment for traversing a ground surface and compacting the material thereof, an upright rotatable and axially reciprocable cylindrical king pin for one pair of said compacting wheels, another upright rotatable and axially reciprocable cylindrical king pin for another pair of said compacting wheels, each king pin including means for rotatably mounting the compacting wheels of a pair of compacting wheels on the king pin at opposite sides of the king pin, said wheel mounting means including longitudinally extending pivot means to permit tilting movement of the wheel mounting means on the axis of the pivot means for adjustment of the positions of the compacting wheels on the king pin in accordance with the contours of the ground surface, supporting means for each of said king pins secured to the main frame, said supporting means each including cylindrical means complementally formed with respect to a king pin and rotatably and axially reciprocably mounting a king pin on the main frame, a center upright rotatable and axially reciprocable cylindrical king pin disposed intermediate the first said king pins, said center king pin including means for rotatably mounting a compacting wheel on the king pin, supporting means for the center king pin secured to the main frame, the last said supporting means including cylindrical means complementally formed with respect to a king pin and rotatably and axially reciprocably mounting the center king pin on the main frame, and motion transmitting means secured to the first said king pin and to said other king pin and center king pin and connecting the king pins to transmit the axial reciprocatory motion of the first said king pin to the other king pins for axially reciprocating the first said king pin and the other king pins in opposite directions.

4. A multi-wheel compactor roller comprising a main frame, ground compacting wheels disposed in substantial transverse alignment for traversing a ground surface and compacting the material thereof, an upright rotatable and axially reciprocable cylindrical king pin for one pair of said compacting wheels, another upright rotatable and axially reciprocable cylindrical king pin for another pair of said compacting wheels, each king pin including means for rotatably mounting the compacting wheels of a pair of compacting wheels on the king pin at opposite sides of the king pin, said wheel mounting means including longitudinally extending pivot means to permit tilting movement of the wheel mounting means on the axis of the pivot means for adjustment of the positions of the compacting wheels on the king pin in accordance with the contours of the ground surface, supporting means for each said king pin secured to the main frame, said supporting means each including cylindrical means complementally formed with respect to a king pin and rotatably and axially reciprocably mounting the king pin on the main frame, a center upright rotatable and axially reciprocable cylindrical king pin disposed intermediate the first said king pins, said center king pin including means for rotatably mounting a compacting wheel on the king pin, supporting means for the center king pin secured to the main frame, the last said supporting means including cylindrical means complementally formed with respect to a king pin and rotatably and axially reciprocably mounting the center king pin on the main frame, a steering collar for each king pin, means non-rotatably securing the steering collar to the king pin and permitting axial reciprocation of the king pin relatively to the steering collar, steering means operatively connected to the steering collars to turn the steering collars and the king pins and wheels for steering the compactor roller, and motion transmitting means secured to the first said king pin and to said other king pin and center king pin and connecting the king pins to transmit the axial reciprocatory motion of the first said king pin to the other king pins for axially reciprocating the first said king pin and the other king pins in opposite directions.

References Cited in the file of this patent

UNITED STATES PATENTS

| | | |
|---|---|---|
| 2,169,916 | Keeler | Aug. 15, 1939 |
| 2,775,925 | Greiner | Jan. 1, 1957 |
| 2,777,709 | Tucker | Jan. 15, 1957 |
| 2,928,486 | Van Meter | Mar. 15, 1960 |

FOREIGN PATENTS

| | | |
|---|---|---|
| 1,069,517 | France | Feb. 10, 1954 |